United States Patent
Rohde et al.

(10) Patent No.: US 7,468,279 B2
(45) Date of Patent: Dec. 23, 2008

(54) SELECTION OF POLYMERIZATION CATALYSTS AND APPARATUS FOR CARRYING THIS OUT

(75) Inventors: Wolfgang Rohde, Speyer (DE); Marc Oliver Kristen, Kelkheim (DE); Dieter Lilge, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 280 days.

(21) Appl. No.: 10/528,268

(22) PCT Filed: Sep. 16, 2003

(86) PCT No.: PCT/EP03/10283

§ 371 (c)(1),
(2), (4) Date: Mar. 17, 2005

(87) PCT Pub. No.: WO2004/026919

PCT Pub. Date: Apr. 1, 2004

(65) Prior Publication Data

US 2006/0122340 A1    Jun. 8, 2006

Related U.S. Application Data

(60) Provisional application No. 60/418,686, filed on Oct. 15, 2002.

(30) Foreign Application Priority Data

Sep. 17, 2002    (DE) ............................ 102 43 239

(51) Int. Cl.
*G01N 31/10*    (2006.01)
*C40B 30/10*    (2006.01)
*B01J 19/24*    (2006.01)

(52) U.S. Cl. .............. 436/37; 506/11; 506/12; 422/131; 422/68.1

(58) Field of Classification Search .......... 436/37, 436/68.1; 422/131, 141, 68.1; 506/11, 12, 506/33

See application file for complete search history.

(56) References Cited

U.S. PATENT DOCUMENTS

| 6,147,171 | A | 11/2000 | Rohde ............... 526/106 |
| 6,417,422 | B1 | 7/2002 | Liu ............... 585/658 |
| 6,873,414 | B2 | 3/2005 | Schüth et al. |
| 7,078,164 | B1 * | 7/2006 | Diamond et al. ............... 435/4 |
| 2002/0017617 | A1 | 2/2002 | Schuth et al. ............... 250/492.1 |

FOREIGN PATENT DOCUMENTS

| EP | 0985678 | 3/2000 |
| WO | 9719115 | 5/1997 |
| WO | 0144801 | 6/2001 |
| WO | 01/57498 | 8/2001 |

OTHER PUBLICATIONS

M. P. McDaniel, "Chromium Catalysts for Ethylene Polymerization," *Advances in Catalysis*, vol. 33, p. 49-95.

M. P. McDaniel, "Chromium Catalysts for Ethylene Polymerization," *Advances in Catalysis*, Academic Press, vol. 33, p. 48-98 (Dec. 1985).

* cited by examiner

*Primary Examiner*—Fred M Teskin
(74) *Attorney, Agent, or Firm*—Jarrod N. Raphael

(57) ABSTRACT

In a method of selecting polymerization catalysts, in particular Phillips catalysts for the polymerization of olefins, from a multiplicity of catalysts on the basis of their catalytic properties, a multiplicity of catalyst precursors or catalyst supports are converted in parallel into polymerization catalysts in a pretreatment step in an array of reactors, where the pretreatment comprises at least one thermal treatment step at from 250 to 1200° C. Furthermore, at least one starting material is converted with the aid of the respective polymerization catalysts under prescribed polymerization conditions into at least one polymer product in a polymerization step and, finally, analysis of the polymer product or products is carried out to determine its composition and/or chosen properties. This makes it possible to carry out a thermal pretreatment of polymerization catalysts quickly under defined conditions which can be varied.

23 Claims, 1 Drawing Sheet

SELECTION OF POLYMERIZATION CATALYSTS AND APPARATUS FOR CARRYING THIS OUT

This application is the U.S. national phase of International Application PCT/EP2003/010283, filed Sep. 16, 2003, claiming priority to German Patent Application 102 43 239.2, filed Sep. 17, 2002, and the benefit under 35 U.S.C. 119(e) of U.S. Provisional Application No. 60/418,686, filed Oct. 15, 2002; the disclosures of International Application PCT/EP2003/010283, German Patent Application 102 43 239.2 and U.S. Provisional Application No. 60/418,686, each as filed, are incorporated herein by reference.

The present invention relates to a method of selecting polymerization catalysts, in particular Phillips catalysts for the polymerization of olefins, from a multiplicity of polymerization catalysts on the basis of their catalytic properties, which comprises a pretreatment step in which a multiplicity of catalyst precursors or catalyst supports are converted into polymerization catalysts in an array of reactors, where the pretreatment comprises at least one thermal treatment step at from 250 to 1200° C., a polymerization step in which at least one starting material is converted with the aid of the respective polymerization catalysts under prescribed polymerization conditions into at least one polymer product, and analysis of the polymer product or products in respect of its composition and/or chosen properties. Furthermore, the invention relates to an apparatus for implementing this method.

In the case of many catalysts, in particular those for heterogeneous catalysis, their chemical composition alone allows little to be concluded about the catalytic activity or selectivity. It is therefore desirable to test as many potential catalysts as possible for their catalytic effectiveness. This should, if possible, be done under many different reaction conditions in order to be able to determine the optimum conditions.

Use has increasingly been made of techniques in which small amounts of substance are employed. This high throughput screening (HTS) allows many different catalyst systems to be tested in a significantly shorter time compared to conventional methods, or for the first time allows a test on a relatively large number of different catalysts to be carried out in an adequate period of time.

Thus, WO 01/44801 describes a method in which a multiplicity of reactors connected in parallel are filled with the catalyst, the starting materials are converted into products over the catalysts present as a fluidized bed in the respective reactors and the outflowing starting materials or products are subsequently analyzed to determine their chemical composition.

However, there are many catalysts which have to be pretreated before use. The conditions of the pretreatment frequently influence the catalyst properties and thus also the catalysis product itself. EP 985 678 A1 discloses the pretreatment or activation of an array of metal-ligand catalysts immobilized on a substrate using a chemical cocatalyst in order for them subsequently to be used as polymerization catalysts. The regions of the array are separated from one another in depressions on the surface of the substrate. This solution suffers from, firstly, the fact that the activation parameters, in particular activation temperature or pressure, can be varied within the array only to a restricted extent, if at all, and secondly, the fact that it cannot be applied to polymerization catalyst systems with thermal pretreatment, as is necessary, for example, in the case of Phillips catalysts for the synthesis of polyolefins.

It is an object of the present invention to overcome the abovementioned disadvantages of the prior art and to provide a method and an apparatus by means of which polymerization catalysts which require a thermal pretreatment can be selected quickly under defined conditions which can be varied.

We have found that this object is achieved by the method of the present invention.

Figure 1:
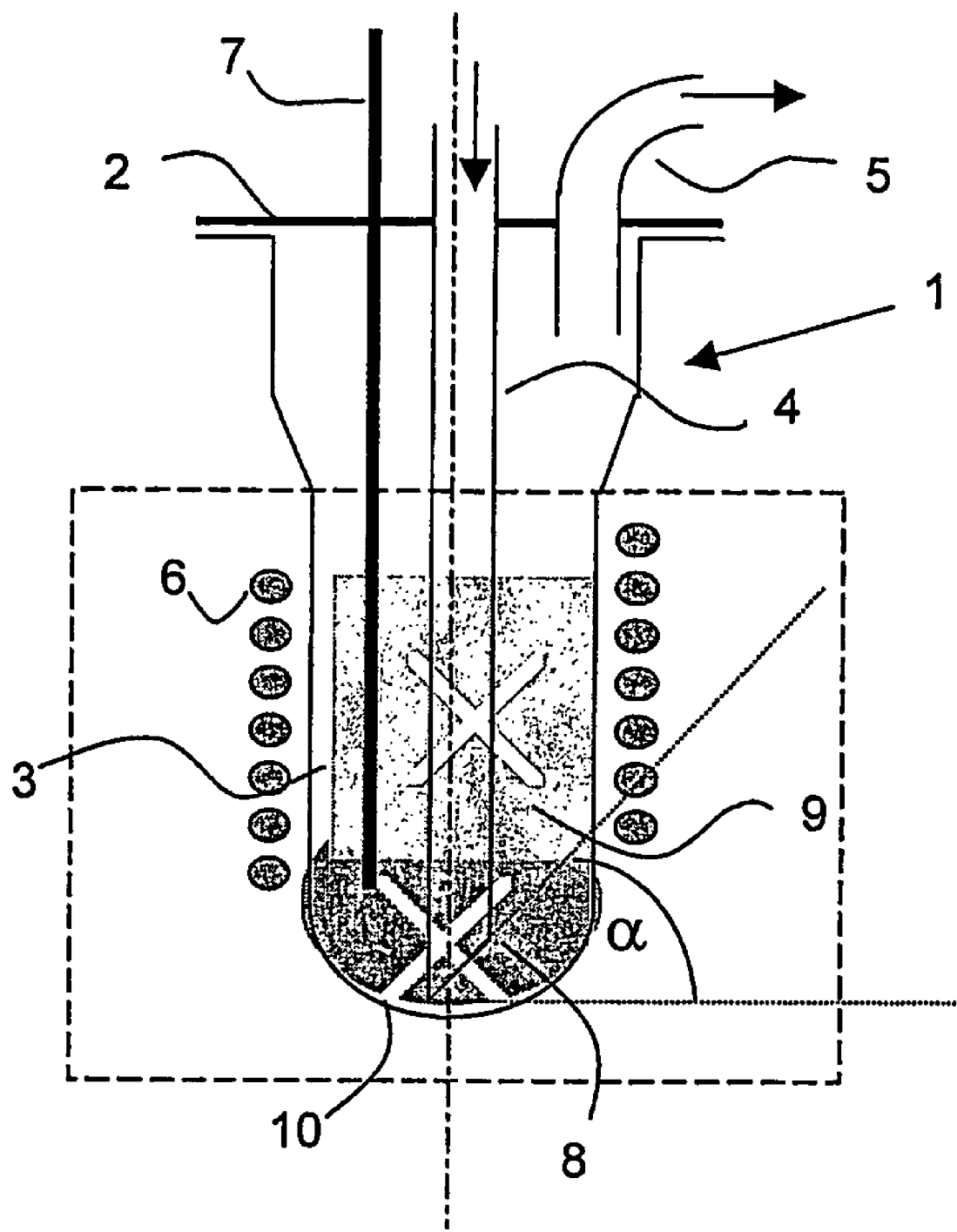
FIG. 1 is a schematic representation of a reactor for examining catalysts for the synthesis of polyethylene.

In the method of the present invention for selecting polymerization catalysts from among a multiplicity of polymerization catalysts on the basis of their catalytic properties, a multiplicity of catalyst precursors or catalyst supports are converted in a pretreatment step into polymerization catalysts in an array of reactors, with the pretreatment comprising at least one thermal treatment at from 250 to 1200° C. Subsequently, at least one starting material is converted in a polymerization step with the aid of the respective polymerization catalysts under prescribed polymerization conditions into at least one polymer product, followed by analysis of the polymer product or products in respect of its composition and/or chosen properties.

The ability to carry out the pretreatment in the respective reactors under various conditions makes it possible to quickly obtain a data set for various pretreated catalysts which could otherwise be built up in the same constancy and diversity only with a great deal of effort by means of individual, successive processes.

The first step of the method of the present invention is a pretreatment step in which various catalyst precursors or catalyst supports are converted into polymerization catalysts. This pretreatment comprises as essential step according to the present invention at least one thermal treatment at from 250 to 1200° C., but it is not necessary for the polymerization catalyst to be the direct product of this thermal treatment. Rather, the thermal treatment can be followed by further treatments or reactions which finally lead to the formation of the active catalyst. The thermal treatment can also be preceded by physical or chemical processes. A plurality of thermal treatments, whether in direct succession or with further treatments in between, are also expressly encompassed by the scope of the present invention. The important thing is that the entire pretreatment, in the simplest case only a thermal activation, is carried out in an array of reactors under defined conditions.

In general, the term "thermal treatment" refers to a heat treatment, in particular a heat treatment under oxidative conditions, in a temperature range above 250° C. and thus significantly above the envisaged working temperature of the catalyst. The object of the thermal treatment is to improve the catalytic, chemical and physical properties of the polymerization catalyst or its support. The thermal treatment can be carried out under inert conditions, for example by passing an inert gas such as noble gases, nitrogen or carbon dioxide through it or by applying a vacuum. Alternatively, depending on the type of thermal treatment, oxidizing or reducing agents or other chemical substances can be added so that a combined physical/chemical activation occurs.

The pretreatment within the scope of the method of the present invention can be carried out either on catalyst precursors or pure catalyst supports. For the purposes of the present invention, catalyst precursors are supported or unsupported chemical compounds which can be converted into the actual active polymerization catalyst by means of the thermal treatment and, if appropriate, further chemical reactions. On the other hand, catalyst supports are solids which are treated thermally, but to which the actual active species or precursors thereof still have to be applied in the subsequent treatment steps.

Examples of catalysts in the case of which the previously supported catalyst precursor is treated thermally under oxidative conditions are the chromium catalysts of the Phillips type for the preparation of polyolefins, as are comprehensively described, for example, in M. P. McDaniel: Chromium Catalysts for Ethylene Polymerisation in Advances in Catalysis Vol. 33. The thermally treated catalyst can subsequently be used directly for the polymerization. However, these catalysts may also be subjected to further treatment steps if appropriate: thus, the thermal treatment in an oxidizing atmosphere can be followed by a further thermal treatment in a reducing atmosphere (e.g. in hydrogen or carbon monoxide). Other types of catalyst reduction are reaction with nonpolymerizable olefins, namely olefins having internal double bonds, e.g. cyclohexene, or other suitable organic substances as described in WO 97/19115 A1 or reaction with metal alkyls, in particular lithium alkyls, boron trialkyls or aluminum trialkyls. Furthermore, the catalysts can be subjected to a prepolymerizaton step by contact with a polymerizable olefin. In principle, however, the method of the present invention is suitable for all catalyst precursors which are either stable under the conditions of the thermal treatment or require the thermal treatment to form the catalytically active compound. Since most organic compounds do not have sufficient thermal stability, the method as applied to catalyst precursors is mainly suitable for inorganic compounds such as oxides, sulfates, phosphates, etc. In the thermal treatment of the catalyst precursors, further reactions apart from simple calcination and oxidative or reductive conversion can also be carried out. Thus, it is known that addition of inorganic fluorine compounds during the thermal treatment of Phillips catalysts effects fluoridation of the catalyst surface. Furthermore, reactions with organic halogen compounds are also known.

The thermal treatment of catalyst supports can be used universally as long as the supports in question are silicate, aluminate or other mineral or inorganic supports, since the actual catalyst is applied, i.e. supported, only after the thermal treatment. The method can therefore be applied in this way to all polymerization catalyst systems which comprise supported components and in which thermal pretreatment of the support has a positive effect on the immobilization process and/or the properties of the supported catalyst. Thus, for example, preference is given to selecting and optimizing supported metallocene or Ziegler catalysts with the aid of the method of the present invention. In the thermal treatment of the catalyst supports, further reactions apart from simple calcination and oxidative or reductive conversion can also be carried out. Thus, it is known that addition of inorganic fluorine compounds during the thermal treatment of Phillips catalysts effects fluoridation of the catalyst surface. Furthermore, reactions with organic halogen compounds are also possible.

In the second step of the method of the present invention, the monomer is converted into the desired polymer product under polymerization conditions. The catalysts employed here are the polymerization catalysts obtained in the previous step.

For the purposes of the present invention, the term "starting material" refers to any chemical substance which can be converted into one or more polymers with the aid of the polymerization catalyst. Preferred starting materials are the monomers ethylene, propylene, 1-butene, 1-hexene and other $C_2$-$C_{20}$-olefins, without the invention being restricted to these.

In particular, the method can be employed regardless of whether the starting material is a gas or a liquid. The starting materials can consist of a single monomer or a monomer mixture and may further comprise additional additives. They can be homogeneous or heterogeneous and consist of one or more phases. Preference is given to the use of gases, liquids, dispersions or emulsions as monomers. The starting material merely has to be such that it can be fed into the reactor and can come into contact with the catalyst. The starting material may have to be dissolved, suspended or dispersed in a liquid carrier in order to be able to be fed into the reactor and brought into contact with the catalyst. The starting material can be fed in either continuously or discontinuously. Furthermore, the starting material may additionally be admixed with an inert carrier fluid if the reaction conditions make this necessary. In this way, nonfluid starting materials can also be fed into the reactor.

The term "polymer product" refers to any polymer resulting from the polymerization step, regardless of its chemical or physical properties. The polymer product can be any natural or synthetic polymer or polymer mixture. Such products include, in particular, all polymers containing C—C units which are derived from monomers having C=C double bonds, regardless of the type of polymerization. The method is preferably applied to homopolymers or copolymers of $C_2$-$C_{20}$-1-alkenes or vinylaromatic or alicyclic monomers, particularly preferably to a homopolymer or copolymer of ethylene, propylene, 1-butene or norbornene, including all possible stereoisomers. Comonomers which can be used here are once again $C_2$-$C_{20}$-1-alkenes, in particular ethylene, propylene, 1-butene or 1-hexene, or else vinylaromatic comonomers such as styrene or functionalized comonomers such as vinyl acetate, acrylic acid or its esters. Copolymers of olefins with carbon monoxide, namely polyketones, also come within the definition of polymeric products. The method can also be applied to other copolymers such as EPDM, EVA, etc. These can be either random copolymers or block copolymers. The method is particularly suitable for HDPE, LDPE, LLDPE, i-PP, s-PP, PB, COC and their copolymers.

In the last step of the method of the present invention, the amount, the composition and/or selected properties of the polymer product are determined to enable conclusions regarding the reactivity and selectivity of the catalyst to be drawn and to allow polymerization catalysts having the desired properties to be selected.

Desired properties of the polymer product may be, in particular, chemical, mechanical, optical or electrical properties, without the method being restricted to these properties of the polymer product. Rather, any property of the polymer product which is known to a person skilled in the art and can be determined can be employed as a criterion for its selection. To determine the properties of the product, it is likewise possible to use all analytical methods available to those skilled in the art. It is particularly advantageous to use methods which make rapid and automatable determination of the property possible, e.g. spectroscopic or chromatographic methods. As particularly advantageous methods of polymer analysis which require only small quantities, mention may be made here of gel permeation chromatography (GPC) and IR and Raman spectroscopy.

The polymerization step is preferably likewise carried out in an array of reactors, so that both the pretreatment and the polymerization are carried out in parallel under defined conditions which can be varied within the assembly. For this purpose, the catalyst precursors which have been subjected to the thermal pretreatment or the catalyst supports to which the catalyst has been applied after the thermal treatment are either taken from the reactors and introduced into a further set of reactors which are provided for carrying out the polymerization step or, preferably, the pretreatment step and the polymerization step are carried out in the same array of reactors, so that transfer from reactor to reactor is dispensed with.

In a further preferred embodiment, the conditions in the pretreatment step and/or polymerization step in the various reactors differ in at least one physical parameter. In this context, the term "physical parameter" refers to any physical quantity which has an influence on the pretreatment or the polymerization step. Such parameters include, in particular, temperature, pressure, concentrations and distribution of starting materials and products, inflow and outflow of reactants and products, fixed-bed or fluidized-bed operation, etc., without the method of the present invention being restricted to the parameters mentioned. The polymerization step is preferably carried out in a temperature range from −80 to 200° C., particularly preferably from 20 to 150° C., and a pressure range from $10^{-4}$ to $10^2$ MPa, particularly preferably from $10^{-2}$ to 6 MPa.

A combination of various pretreatments, whether in parallel or in succession, can also be usefully employed within the scope of the method described. The method described can display its particular strength when the reaction conditions in the respective reactors differ in precisely one reaction parameter during the pretreatment step and the polymerization step together. In planning the optimal variation of the pretreatment and polymerization conditions, recourse may be made to the generally known principles of combinations, in particular combinational chemistry.

It is particularly preferred that the catalysts in the respective reactors differ in at least one chemical property independently of or in combination with the variation of the physical parameters. In this way, a data set (library) from which not only the influence of the chosen reaction conditions and catalysts used but also the influence of the pretreatment, in particular the thermal activation, of the catalyst itself on the reactivity, selectivity and/or desired properties of the product can be derived can be obtained particularly quickly and simply by the pretreatment step being included in the selection process. The method can be employed particularly advantageously when the reaction conditions in the pretreatment itself have a strong influence on the reactivity, selectivity and/or desired properties of the product. However, it is also possible to charge all reactors with the same catalyst and to examine only the influence of the polymerization conditions or the chemical composition, in particular the monomer composition, or the type and amount of a cocatalyst on the chosen catalyst.

In a further advantageous embodiment of the invention, the polymerization catalyst is an inorganic, in particular mineral, catalyst. Here, the thermal treatment is usually referred to as calcination and represents a frequently used pretreatment for solid and supported catalyst systems. It is a thermal activation in which the influence of the conditions is particularly difficult to predict on a molecular level and effective empirical optimization of the pretreatment and polymerization conditions is indispensable. During a calcination, various reactions and processes such as (a) the decomposition of thermally unstable compounds (carbonates, nitrates, hydroxides, organic salts) to form oxides with evolution of gases, (b) formation of new compounds via solid-state reactions, (c) crystallization of amorphous structures, (d) reversible transformation of crystalline structures and, in particular, (e) alteration of the pore structure and the mechanical strength of supported catalysts take place, without the invention being restricted to the processes mentioned. To obtain optimum catalysts, it is necessary for the optimum calcination conditions to be determined experimentally, for which the method of the present invention is particularly useful. For this purpose, the calcination temperature, the calcination time and the concentrations of participating reactants can be varied in the array of reactors, without the method being restricted thereto. The temperature is varied in the range from 250° C. to 1200° C., preferably from 350 to 1000° C., more preferably from 400 to 950° C., particularly preferably in a range from 500 to 925° C.

The method of the present invention is particularly useful for the selection of Phillips catalysts for the polymerization of olefins in which the calcination temperature, which can be varied in a range from 400 to 925° C., has a particularly strong influence on not only the catalyst activity but also on further important properties of the product, e.g. the width of the molar mass distribution $M_w/M_n$ or the melt flow rate of the polymer. The molar mass distribution in turn has a considerable influence on the rheological, mechanical and other macroscopic properties of the polymer product. The influences of the calcination conditions are described, for example, in M. P. McDaniel: Chromium Catalysts for Ethylene Polymerisation in Advances in Catalysis Vol. 33. Use of the data set determined by means of the method of the present invention enables specific matching of the activation and polymerization conditions to be carried out and the polymer product to be provided with the properties which are optimum for the desired application of the product. Phillips catalysts are catalysts in which a chromium compound, either alone or in combination with other cocatalysts, is applied to a solid support, usually silicate, and the chromium is converted into the hexavalent state by calcination. The method can be advantageously used both in the homopolymerization and copolymerization of 1-olefins, in particular the homopolymerization of ethylene and propylene and the copolymerization of ethylene or propylene with other monomers, in particular propylene or ethylene, 1-butene and 1-hexene. In general, the method is particularly useful for all forms of polymerization over supported catalysts, as long as the polymerization reaction is preceded by a thermal pretreatment of the catalyst precursor or support, in particular a thermal activation.

Furthermore, it is advantageous to operate the reactors continuously during the pretreatment step and/or the polymerization step, i.e. to feed a continuous feed stream to the reactors during the pretreatment step and/or the polymerization step and, if appropriate, to take off a continuous outflow stream. In the case of fluid, in particular liquid and gaseous, starting materials, this can be carried out by the starting material or materials itself/themselves generating sufficient flow through the reactor for suitable reaction conditions to be made possible. Alternatively, an inert carrier fluid can be mixed with the starting material to increase the feed stream or to decrease the starting material concentration in the respective reactor. However, batchwise operation is likewise possible both during the pretreatment step and during the polymerization step by the reactor being supplied at the beginning or during the reaction with the starting materials and the catalyst without an outflow stream being produced. After activation and reaction are complete, the reactor is emptied and the products are analyzed.

When a continuous feed stream is employed, it is desirable, both in the pretreatment of the catalysts and the polymerization step, for the flow of the feed stream into the respective reactor to be such that a fluidized-bed of catalyst is formed.

This ensures that uniform activation of the catalyst and also uniform conversion of the starting material to the products over the catalyst occur. Furthermore, this results in improved temperature control. Methods of determining the feed stream required to produce a stable fluidized catalyst bed are generally known to those skilled in the art; for example, the empirical method described in WO 01/44801 can be employed.

The method is particularly effective and saves a great deal of time when the catalyst precursor is also prepared in the respective reactor. Here, the chemical properties of the catalysts can be varied in combination. This variant is particularly useful in the case of simple catalyst systems for which no major purification steps are necessary.

When the method is applied to the preparation of polymers, particular preference is given to determining the density, the molar mass distribution $M_w/M_n$, its moments, e.g. $M_w$, $M_n$, $M_z$, the melt flow rate in accordance with DIN EN ISO 1133 (MFR) and/or the limiting viscosity in solution in accordance with ISO 1628 as selected properties of the product and employ them for the selection. In addition, it is also possible to measure other molecular, mechanical, optical, electrical, acoustic properties and also the chemical and biological stability or other properties which determine the suitability of the polymer for use in the envisaged application. The methods of determination are generally known to a polymer analyst and are generally defined in standards.

A further aspect of the present invention is an array of reactors for implementing the method of the present invention. Here, the respective reactors have a housing which can be sealed from the outside and has a lower part which in turn has a bottom for accommodating a bed of a catalyst and is equipped with an upper part which can preferably be connected in a sealed manner to the lower part so as to be able to resist high temperatures above 250° C. The temperature resistance of the seal depends on the position of the heating of the reactor and on the heat conduction properties of the wall material used for the reactor. In the case of materials which have poor heat conduction and when only the lower part of the reactor is heated, the seal can be made of less thermally stable materials such as plastics. The housing has no internals such as gas distributor plates or frits which restrict the expansion of the fluidized bed. Furthermore, the respective reactors have an inlet for introducing a feed stream into the reactor with an inlet opening directed into the interior of the reactor, with the inlet opening being arranged so that it projects into the catalyst bed and the feed stream allows fluidization of the bed to form a fluidized bed. Finally, the reactor has an outlet for discharge of the outflow stream. Preference is given to the starting material stream forming the feed stream, but it is also possible for further inert fluids or fluid mixtures to be mixed into it. The outflow stream is preferably likewise formed by unreacted starting material and, in the case of fluid products, the product stream.

An array of such reactors enables the above-described method to be implemented in a particularly inexpensive and simple manner, since pretreatment and polymerization under a wide range of pretreatment and polymerization conditions, including temperatures above 250° C. and the use of reactions with formation of solid products, are made possible. Furthermore, it is ensured that the fluidized bed of catalyst is generated directly by blowing the feed stream into the catalyst bed and no frits or other internals which restrict the expansion of the fluidized bed in the reactor are used. Frits are problematical in that they have a limited thermal stability, block easily, lead to thermal stresses in the reactor and make temperature control of the reactor difficult.

Preference is given to the upper part being connected in a sealed manner to the lower part of the reactors so as to be able to resist high temperatures, in order to be able to work at temperatures above 350° C., particularly preferably in a temperature range from 400 to 925° C., at which conventional plastic O-rings become unusable, and nevertheless be able to feed the catalysts readily into the reactors. The temperatures necessary for calcination of Phillips catalysts can be achieved in the reactor in this way. Suitable materials for such a reactor are fused silica or stainless steel, but also other high-temperature-resistant materials such as ceramic. If necessary, the inner wall of the reactors can be lined with a material which is inert in respect of the reactions.

The construction of the reactors is particularly simple when the inlet is at least partly configured as a capillary and the capillary is sealed into the upper part of the reactor.

In a further advantageous embodiment of the array of reactors of the present invention, each reactor has a first temperature control unit having a heating and/or cooling element which is located at an outer surface of the lower part. In addition, it has a temperature sensor for measuring the temperature in the fluidized bed. The first temperature controlled unit serves to control the temperature of the reactor directly from the outside. The heating or cooling element is preferably electrically operated. On the other hand, the use of a heat transfer fluid for temperature control has the advantage that a particularly uniform temperature distribution is possible. The invention also provides for groups of reactors in the array to be provided with a common temperature control unit, so that, for example, a plurality of reactors can be operated at the same temperature. Particular preference is given to grouping together from two to eight, in particular four, reactors.

Alternatively or in addition, a second temperature control unit for controlling the temperature of the feed stream can be provided so as to heat/cool the feed stream outside the reactors, as a result of which a better and quicker temperature response can be achieved. For this purpose, the second temperature control unit is thermally connected to the inlet outside the reactor.

The apparatus and method of the present invention are illustrated below with reference to the FIGURE, without the invention being restricted to this example.

The FIGURE schematically shows a reactor for examining catalysts for the synthesis of polyethylene by the Phillips process. In the Phillips process, the actual reaction is preceded by a calcination of the chromium-laden silicate support to activate the catalyst, with the chromium which has usually been applied in the trivalent state to the support being converted into the hexavalent state. The oxidative calcination takes place at from 400 to 925° C. and has a considerable influence on the properties of the polyethylene produced. As is generally known to those skilled in the art, variation of the calcination conditions enables the molar mass distribution and the melt flow rate (MFR), in particular, to be influenced in a targeted manner. However, the reactor is not only suitable for Phillips catalysts but can be used generally for, in particular the examination of catalyst systems which are employed at high temperatures and possibly high pressures.

The reactor which is used for employing the method of the present invention in an array of a plurality of reactors having an identical construction comprises a housing (1) having an upper part (2) and a lower part (3) which is joined in a detachable manner to the upper part. Upper part (2) and lower part (3) are sealed against one another by means of seals (e.g. metal seals). As reactor material, preference is given to using high-temperature-resistant steel or fused silica, depending on pretreatment or activation and polymerization conditions.

The two-piece construction allows the reactor to be loaded in a simple fashion and the omission of further seals significantly widens the range of conditions under which the reactor can be used. In particular, the examination of reactions at above 400° C. is possible. The closed reactor makes it possible to set the conditions separately in each of the reactors. In particular, the starting materials, the starting material concentrations, the catalysts and the pressure can be varied individually or in combination in a targeted manner and independently for each individual reactor.

An inlet configured as a capillary (4) is let into the upper part (2), preferably along the central axis. This allows the feed stream, which in the simplest case is formed by the starting material stream, to be introduced into the reactor and its opening (8) reaches virtually to the bottom of the lower part (3). This ensures that the capillary (4) projects into the catalyst bed so that the feed stream can fluidize the catalyst. This leads to formation of a fluidized catalyst bed (9) in operation with an appropriate amount of feed. The end of the capillary (4) inside the reactor can be cut off at right angles to the axis of the capillary, but it is also conceivable for it to be cut off at an angle α different from zero, in particular in combination with a capillary offset from the central axis, to generate particular flow patterns. The angle α can be in the range from 0 to 80°. Alternatively, an impingement plate can be installed at the opening of the capillary or the capillary can be provided with lateral openings through which the starting material stream is blown into the catalyst bed. Depending on the diameter of the reactor vessel, the diameter of the capillary is in the range from 0.5 to 10 mm, preferably from 1 to 5 mm. No frits are used in the reactor below or above the opening (8) of the capillary (4).

The upper part (2) is also provided with an outlet (5) via which unreacted starting material or a carrier gas can leave the reactor again. The outlet is preferably provided with a retention device (e.g. a heat-resistant nonwoven or the like) which prevents particles of fluidized catalyst from leaving the reactor with the outflow stream.

The lower part (3) is essentially cylindrical and is somewhat widened in its upper part and has a hemispherical bottom (10) which serves to accommodate the catalyst bed. The widening reduces the flow velocity in the upper part and keeps the fluidized catalyst bed (9) in the lower region of the reactor. However, other reactor shapes are also conceivable. In particular, a bottom having the shape of a truncated cone tapering in a downward direction can also be used.

To measure or regulate the temperature in the interior of the fluidized bed (9), a high-temperature-resistant temperature sensor (7) is also provided. The temperatures necessary for carrying out the calcination can be generated in two ways: the first way is to provide a heating/cooling element (6) around the lower part (3) of the reactor, by means of which a constant temperature can be generated. This is preferably electrically operated. Electric cooling can be achieved by the use of Peltier elements. Alternatively, heating or cooling can be achieved by means of heating/cooling coils operating using a fluid, double-walled reactor or the like. As a result of the location of the inlet (4) in the interior of the reactor, the fluidized bed (9) is in direct contact with the reactor wall, so that direct and therefore rapid heat transfer from the reactor wall to the fluidized bed occurs.

Another way of achieving the calcination or reaction temperature is to introduce the heat via an appropriately preheated feed stream. This is preferably achieved by two gas streams heated to different temperatures being mixed in various ratios so that a feed stream having a different temperature is obtained for each reactor in the array. This makes it possible to achieve, firstly, simple variation of the temperature between reactors and, secondly, a rapid temperature change in the reactors. A combination of both heating variants, in particular calcination using the heating element (6) and subsequent polymerization using a preheated feed stream, is also conceivable.

The temperatures in the reactors can generally be varied within a range from −50° C. to 1200° C., for pretreatment of Phillips catalysts particularly preferably in the range from 400° C. to 925° C. Depending on the embodiment, reactors can be operated in a pressure range from $10^{-4}$ to $10^2$ MPa, preferably from $10^{-2}$ to 1 MPa, particularly preferably at atmospheric pressure. The temperature and the pressure and also other pretreatment and polymerization parameters can either be kept constant or varied over time both during the thermal treatment and during the polymerization step.

The number of reactors used in the array is determined by the use. For rapid screening to preselect suitable catalysts, a relatively large number of relatively small parallel reactors is used to bring the number of suitable catalysts down as quickly as possible. Variation of calcination and reaction conditions is carried out to only a small extent here. In such a case, preference is given to using 16, 24, 32, 48, 96 or more reactors having a volume of from 1 to 100 $cm^3$, preferably from 5 to 50 $cm^3$, particularly preferably from 10 to 30 $cm^3$. Such a preselection can be followed by a more precise selection of the catalysts with the pretreatment and polymerization conditions being varied more widely for a reduced number of catalysts using a reduced number of reactors having a larger volume. Finally, the above-described array of reactors can be used for only one catalyst to carry out only an optimization of the pretreatment and polymerization conditions with increased analytical precision. Here, preference is given to using 4, 8 or 16 parallel reactors which usually have a larger volume than in the case of rapid screening, preferably from 30 to 200 $cm^3$, particularly preferably from 60 to 90 $cm^3$.

The implementation of the method of the present invention is described below for a particularly preferred embodiment of the selection of Phillips catalysts with reference to the FIGURE:

Firstly, each lower part (3) of a reactor is charged with an amount of from a few milligrams to one gram of the chromium catalyst precursor to be tested, which may, if appropriate, be provided with further cocatalysts.

Alternatively, the chromium catalyst precursor, i.e. the unactivated catalyst, can also be prepared in the reactor. For this purpose, the silicate support located in the reactor is fluidized and admixed with the intended chromium catalyst solution and additives such as ammonium hexafluorosilicate and subsequently dried in the fluidized bed. If appropriate, a vacuum can be applied for drying in a closed reactor. Even thermal pretreatment of the silicate support used is possible in the present reactor.

To examine the influence of the chemical composition of the catalyst on the polymerization reaction, each reactor is charged with a catalyst which differs from the other catalysts in at least one chemical property. This chemical property can be any molecular property such as constitution, configuration or conformation. Enantiomeric forms of catalysts also fall into this category. In the case of Phillips catalysts, the particle shape and size of the chosen silicate support, its surface area, the mean pore volume, the pore radius distribution are of particular importance. However, the type and pretreatment of the support used, the amount of chromium applied, the possible use of further elements such as titanium or aluminum, which are present in the form of their compounds, e.g. as salts, can also be varied without the method of the present invention being restricted thereto.

After the reactor has been closed by means of the upper part (2), oxygen in the form of air is blown as feed stream into the reactor via the capillary (4) and the reactor is brought to the appropriate calcination temperature in the range from 400 to 925° C. in order to activate the chromium catalyst. The calcination conditions can be the same in all reactors in the array, but the calcination conditions can also be varied from reactor to reactor to examine the influence of the calcination on the reaction rate, product distribution and the properties such as melt flow rate (MFR), mean molar mass $M_w$, molar mass distribution $M_w/M_n$, etc. Grouping reactors into temperature groups is also possible.

The airstream is passed through the capillary (4) right down into the catalyst bed. Its flow is set so as to be sufficiently high for the catalyst to be fluidized but very little catalyst to be carried into the outlet by the air stream. Depending on the particle size and amount of the catalyst used, fluidization of the catalyst can even be omitted without the quality of the calcination in the interior of the bed suffering. This is the case, in particular, for coarse-grained catalyst material or small amounts, while fine-grained catalysts should be fluidized so as to avoid the risk of uniform oxidation of the catalyst no longer being ensured. If necessary, further nitrogen or argon can be mixed as inert gas into the air stream to achieve a sufficiently large feed stream. Oxygen sources other than air can also be used to achieve oxidative conditions.

After calcination is complete, the air stream is turned off and the reactor is flushed with inert gas and then brought to the reaction temperature for the polymerization. If desired, the polymerization can be preceded by a further pretreatment of the catalyst with CO at from 100 to 600° C., preferably from 200 to 400° C., or by means of other reducing agents, as is also customary on a production scale.

Alternatively, the activated catalyst can also be discharged from the reactor in order to be examined in other ways. In such a case, the catalyst is particularly preferably taken from the reactors automatically via the capillary (4). For this purpose, a vacuum is applied to the opening of the capillary (4) outside the reactor and the catalyst bed is sucked through the capillary (4) into a receiver while an inert gas stream, preferably argon, flows in through the outlet (5). The activated catalyst can then be subjected to a detailed manual or automated analysis to determine its physical and chemical properties, in particular its pore size and pore size distribution. Finally, the catalyst can also be used for the polymerization in the separate vessel.

After calcination in the reactor is complete, the ethylene is introduced into the reactor through the inlet opening (8), and in the reactor comes into contact with the catalyst and, provided that the catalyst to be tested is sufficiently active, is polymerized to polyethylene. In the polymerization reaction, too, the conditions for all reactors in the array can be identical, or the reaction conditions are varied from reactor to reactor to examine the influence of the reaction conditions on the reaction rate and the product properties such as MFR, mean molar mass, molar mass distribution, etc. However, a particular advantage of the method described is the opportunity of, in one trial, determining the influence of both the calcination conditions and the reaction conditions so as to achieve particularly quick and effective selection of suitable catalysts.

During the polymerization reaction, it is likewise preferred that the ethylene flow selected is able to generate a stable fluidized bed (9) of catalyst in the reactor, with the excess of ethylene being able to be recirculated. However, it is also possible to use an additional inert gas stream, e.g. of argon, in particular to ensure the formation of a fluidized catalyst bed at low ethylene flows. However, a reaction in a fixed bed is not ruled out here either if the nature of the catalyst and the reaction conditions permit. A combination of fixed-bed conditions during thermal treatment and fluidized-bed conditions during the polymerization reaction or vice versa can likewise be realized.

After a predetermined time, the starting material stream is turned off and the amount, the mean molar mass $M_w$, the molar mass distribution $M_w/M_n$, the melt flow rate in accordance with ISO 1133, and also, if appropriate, further properties of the polyethylene, in particular mechanical and rheological properties are determined using methods available to those skilled in the art. For this purpose, samples for examination are taken from the individual reactors and analyzed separately. The samples can be taken manually or automatically. The analysis can be carried out by mechanical or spectroscopic methods or other methods known to those skilled in the art.

In the method of the present invention, the conditions of the thermal pretreatment and subsequent polymerization are monitored for each reactor and are subsequently linked to the corresponding product properties together with the respective catalyst composition and pretreatment in a databank, so that a multidimensional field (library) from which the respective dependencies can be taken is obtained. Preference is given to presenting the data in visual form as graphs or diagrams to make the effects available to the experimentor.

Apart from the treatment of catalyst precursors on mineral catalyst systems, the method of the present invention is also suitable for the thermal treatment of an inorganic, in particular mineral, support for other catalyst systems such as metallocene or Ziegler catalysts. For this purpose, the support can be pretreated thermally in a manner analogous to the procedure described above for Phillips catalysts at from 250 to 1200° C., with the addition of oxygen usually being replaced by an inert gas stream. The temperature and duration of the pretreatment depends on the desired properties such as water content, proportion of OH groups on the surface, surface structure, etc., and can be determined empirically with the aid of the method of the present invention. The chemical composition of the support surface and thus its chemical properties can also be varied further in this treatment step by means of appropriate additives, e.g. inorganic fluorine compounds or organic halogen compounds. After the reactor has been cooled, the catalyst support is admixed with a solution of the active component of the catalyst, e.g. a metallocene complex, and the catalyst which has been supported in this way is, if desired, dried by passing an inert gas stream through a fluidized bed in the reactor. Further solutions which, for example, bring about activation of the catalyst, better fixing to the support or the like can also be applied subsequently. In the preparation of metallocene catalysts, it is also possible for the activator, for example methylaluminoxane (MAO) to be applied to the support first and the metallocene solution to be added only after that. The supported polymerization catalysts which have been prepared in this way are finally either taken from the reactors or, preferably, used directly in the respective reactors for polymerization to give the desired polymer products.

The method has been described for one illustrative embodiment in which all steps forming part of the selection procedure (catalyst preparation, thermal treatment and polymerization) are carried out in one reactor. However, it is also possible to use the reactor described only as calciner and to examine the polymerization reaction using another existing or more suitable reactor arrangement. In this way, the reactor described can be integrated into conventional high throughput systems.

The method described can be carried out manually in its entirety in one step. However, substantial automation in all possible steps is advantageous, since this increases the rapidity and reproducibility of the method.

Apart from the embodiments described, further modifications of the present invention are conceivable. In particular, new analytical methods can be employed in the method of the present invention.

We claim:

1. A method of selecting Phillips catalysts from a multiplicity of Phillips catalysts based on catalytic properties of the Phillips catalysts comprising:
in a pretreatment step, converting a multiplicity of catalyst precursors or catalyst supports in parallel into Phillips catalysts in an array of reactors, wherein the pretreatment step comprises at least one thermal treatment step at from 250 to 1200° C.;
in a polymerization step, converting at least one starting material into at least one polymer product with the aid of the respective Phillips catalysts; and
in an analysis step, analyzing at least one composition and chosen properties of the polymer product or products formed in the polymerization step.

2. The method as claimed in claim 1, wherein the polymerization step is carried out in parallel for the multiplicity of catalyst precursors or catalyst supports in the array of reactors.

3. The method as claimed in claim 2, wherein the pretreatment step and the polymerization step are carried out in the same array of reactors.

4. The method as claimed in claim 2, wherein conditions in at least one of the pretreatment step and polymerization step in the respective reactors differ in at least one physical parameter.

5. The method as claimed in claim 1, wherein the Phillips catalyst in the respective reactors differ in at least one chemical property.

6. The method as claimed in claim 1, wherein a feed stream comprising at least one monomer is fed continuously to the respective reactors in at least one of the pretreatment step and the polymerization step.

7. The method as claimed in claim 6, wherein, in at least one of the pretreatment step and the polymerization step, the feed stream is passed through the respective reactor in such a way that a fluidized bed of catalyst is produced.

8. The method as claimed in claim 1, wherein the polymer product or products is selected from the group consisting of polyethylene, polypropylene, poly-1-butene, their copolymers and their stereoisomers.

9. The method as claimed in claim 8, wherein chosen properties of the polymer product are selected from the group consisting of density, molar mass distribution $M_w/M_n$ and its moments, limiting viscosity in solution in accordance with ISO 1628, melt flow rate in accordance with DIN EN ISO 1133, proportion of comonomer, and combinations thereof.

10. The method as claimed in claim 1, wherein the thermal treatment step is carried out at from 350 to 1000° C.

11. The method as claimed in claim 1, wherein the thermal treatment is carried out at from 400 to 925° C.

12. A method of selecting polymerization catalysts from a multiplicity of polymerization catalysts based on catalytic properties of the polymerization catalysts comprising:
in a pretreatment step, converting a multiplicity of catalyst precursors or catalyst supports in parallel into polymerization catalysts in an array of reactors, wherein the pretreatment step comprises at least one thermal treatment step at from 250 to 1200° C.;
in a polymerization step, converting at least one starting material into at least one polymer product with the aid of the respective polymerization catalysts; and
in an analysis step, analyzing at least one composition and chosen properties of the polymer product or products formed in the polymerization step,
wherein a feed stream comprising at least one monomer is fed continuously to the respective reactors in at least one of the pretreatment step and the polymerization step, and the feed stream is passed through the respective reactor in such a way that a fluidized bed of catalyst is produced.

13. The method as claimed in claim 12, wherein the polymerization step is carried out in parallel for the multiplicity of catalyst precursors or catalyst supports in the array of reactors.

14. The method as claimed in claim 13, wherein the pretreatment step and the polymerization step are carried out in the same array of reactors.

15. The method as claimed in claim 13, wherein conditions in at least one of the pretreatment step and polymerization step in the respective reactors differ in at least one physical parameter.

16. The method as claimed in claim 12, wherein the polymerization catalyst in the respective reactors differ in at least one chemical property.

17. The method as claimed in claim 12, wherein the polymerization catalyst is an inorganic catalyst.

18. The method as claimed in claim 17, wherein the inorganic catalyst is a Phillips catalyst.

19. The method as claimed in claim 12, wherein the polymer product or products is selected from the group consisting of polyethylene, polypropylene, poly-1-butene, their copolymers and their stereoisomers.

20. The method as claimed in claim 19, wherein chosen properties of the polymer product are selected from the group consisting of density, molar mass distribution $M_w/M_n$ and its moments, limiting viscosity in solution in accordance with ISO 1628, melt flow rate in accordance with DIN EN ISO 1133, proportion of comonomer, and combinations thereof.

21. The method as claimed in claim 12, wherein the thermal treatment step is carried out at from 350 to 1000° C.

22. The method as claimed in claim 12, wherein the polymerization catalyst is a mineral catalyst.

23. The method as claimed in claim 12, wherein the thermal treatment is carried out at from 400 to 925° C.

* * * * *